Dec. 13, 1955  J. A. SCHUETTE  2,726,915
LATERAL THRUST BEARING FOR A FILING CABINET DRAWER SLIDE
Filed April 22, 1953
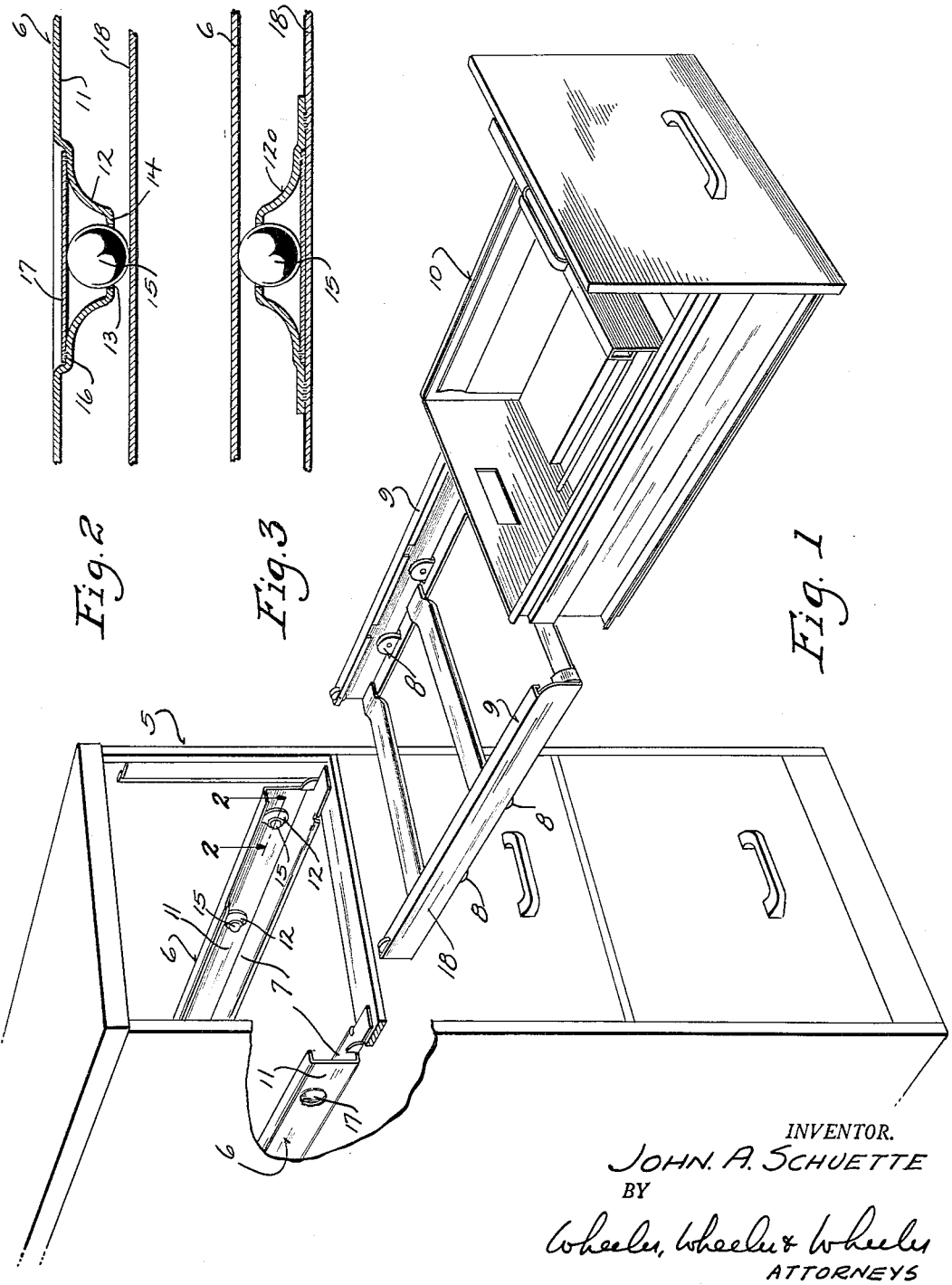
INVENTOR.
JOHN A. SCHUETTE
BY
Wheeler, Wheeler & Wheeler
ATTORNEYS United States Patent Office 2,726,915
Patented Dec. 13, 1955

2,726,915
LATERAL THRUST BEARING FOR A FILING CABINET DRAWER SLIDE

John A. Schuette, Manitowoc, Wis., assignor to Invincible Metal Furniture Co., Manitowoc, Wis., a corporation of Wisconsin Application April 22, 1953, Serial No. 350,467

4 Claims. (Cl. 312—337)

This invention relates to a lateral thrust bearing for a filing cabinet drawer slide.

It is conventional to provide filing cabinet drawers with drawer suspension slides which have rollers to facilitate drawer movement. The object of the present invention is to further facilitate drawer movement not only by reducing friction but by more accurately guiding the movement of the drawer suspension slide through the provision of lateral thrust bearings between the housing channel and the drawer suspension slide which operates therein.

In the preferred construction herein disclosed, the bearings take the form of a blister integrally formed in the side wall of one of the relatively movable parts, the shape of the blister being such that it includes a shoulder spaced from its apertured outer face at such a distance that a backing plate can be seated against the shoulder and welded in position as a retainer for a ball thrust bearing projecting through the aperture.

In the drawings:

Fig. 1 is a view in perspective showing in relatively separated positions a drawer file cabinet, drawer suspension slide, and drawer, the cabinet having a housing channel provided with thrust bearings in accordance with a preferred embodiment of the invention.

Fig. 2 is a detailed view taken in section on an enlarged scale through one of the thrust bearings.

Fig. 3 is a fragmentary detailed view showing in section a modified embodiment of the invention.

With the exception of the thrust bearing, the entire organization is conventional. The cabinet 5 has a housing channel 6 providing a track at 7 for the rollers 8 of the drawer suspension slide 9 in which the drawer 10 is slidably mounted. As the drawer is drawn out of the cabinet, it rests upon the rollers 8 which, in turn, roll upon the tracks 7 of the channels 6 to advance the drawer suspension slide at half the rate of drawer movement.

In accordance with the present invention, thrust bearing means is provided upon one of the relatively movable elements for the more accurate guidance of reciprocative movement. By preference the thrust bearing means is incorporated in the housing channel 6, the side wall 11 of which is formed inwardly at 12 to provide a "blister" centrally apertured at 13 in its wall portion 14 to receive and confine a ball thrust bearing 15. Intermediate its depth, the blister has an annular shoulder 16 on which the ball confining backing plate 17 is seated and welded. The spacing between the shoulder 16 and the apertured wall 14 of the blister is so related to the dimensions of the ball as positioned in the aperture that the ball is confined against any substantial displacement away from its bearing seat in the aperture. It will be understood that the aperture is sufficiently smaller than the diameter of the ball to preclude escape of the ball, but is large enough to permit a substantial portion of the ball periphery to project. As will be observed in Fig. 1, at least two thrust bearings are provided in each of the housing channels, it being particularly desirable that these be in mutually spaced positions near the front of the cabinet.

While it is preferred that the thrust bearings be seated in integral embossed blisters formed from material of the housing channel, certain modifications are possible. Fig. 3 suggests two such modifications, either one of which may be used indepndently of the other. The first modification consists in having the thrust bearing carried by the drawer suspension slide on the external surfaces of the side rails 18 thereof. The second modification consists of the formation of the ball retainer or blister 120 as a separately fabricated piece spot-welded or otherwise fastened to the part on which the thrust bearing is to be carried. While both of these modifications are contained in a single view, it is again emphasized that the adoption of either one does not require adoption of the other, either idea independently being alternatively usable in a drawer file otherwise corresponding with Fig. 1.

I claim:

1. In a filing cabinet having a drawer opening and a drawer slidable through said opening, the combination with a housing channel mounted interiorly of the filing cabinet at the level of said opening, a drawer suspension slide in which the drawer is slidable, said slide being reciprocably mounted on the housing channel, and lateral bearing means carried by the housing channel and projecting inwardly toward the path of reciprocation of the drawer suspension slide, the lateral thrust bearing comprising an inwardly embossed blister constituting an integral portion of the housing channel projecting from an inner face of the housing channel and having a shoulder offset inwardly from the outer face of the housing channel, a ball seated in the blister and projecting therefrom through an aperture with which the blister is provided and a backing plate seated on such shoulder and connected with the housing channel in substantial engagement with the ball at a spacing from the blister aperture just sufficient to hold the ball to the portion of the blister surrounding the aperture.

2. In a filing cabinet, the combination with a housing channel member having a base web and edge flanges, and a drawer support member slidable in said channel between said flanges, of a bearing between the base web of the channel member and the slidable member, said bearing comprising a blister projecting laterally from one of said members toward the other, said blister comprising a portion of one of said members embossed outwardly therefrom and having a front wall provided with a circular aperture, the margins of the wall about said aperture constituting a seat, a ball bearing having a diameter greater than the diameter of said aperture against said seat and having a surface portion thereof projecting through the aperture, said blister having a side wall provided with an outwardly embossed shoulder at the level of the rear of the ball bearing, and a backing plate fixedly seated upon said shoulder to close said blister behind said ball bearing and engaged therewith to hold said ball bearing against its seat, the ball bearing being free of contact with said blister between said front wall and said backing plate.

3. The device of claim 2 in which said blister is mounted on the base web of the channel member.

4. The device of claim 2 in which the blister is mounted on the slidable member.

References Cited in the file of this patent

UNITED STATES PATENTS

| 1,227,889 | Cox | May 29, 1917 |
| 1,929,762 | Ulrich | Oct. 10, 1933 |
| 1,970,439 | Townsend | Aug. 14, 1934 |
| 2,095,487 | Bullock | Oct. 12, 1937 |

FOREIGN PATENTS

| 324,319 | Great Britain | Jan. 15, 1930 |